United States Patent [19]
Cole et al.

[11] Patent Number: 5,861,652
[45] Date of Patent: Jan. 19, 1999

[54] METHOD AND APPARATUS FOR PROTECTING FUNCTIONS IMBEDDED WITHIN AN INTEGRATED CIRCUIT FROM REVERSE ENGINEERING

[75] Inventors: Richard K. Cole, Woodland Park; James P. Yakura, Colorado Springs, both of Colo.

[73] Assignee: Symbios, Inc., Fort Collins, Colo.

[21] Appl. No.: 623,470

[22] Filed: Mar. 28, 1996

[51] Int. Cl.$^6$ .............................. H01L 27/10; H01L 29/78
[52] U.S. Cl. ........................ 257/386; 257/901; 257/906; 257/908; 257/379; 257/350; 257/368; 257/395; 257/392; 257/360; 257/393
[58] Field of Search ..................... 257/789, 906, 257/908, 901, 904, 235, 215, 203, 204, 206, 288, 312, 341, 350, 355–358, 360, 368, 369, 327, 326, 379, 380, 382, 393, 385, 386, 392

[56] References Cited

U.S. PATENT DOCUMENTS

| | | | |
|---|---|---|---|
| 3,576,478 | 4/1971 | Watkins et al. | 257/380 |
| 4,251,688 | 2/1981 | Furner | 179/1 GQ |
| 4,271,424 | 6/1981 | Inayoshi et al. | 257/751 |
| 4,532,609 | 7/1985 | Iizuka | 257/379 |
| 4,593,384 | 6/1986 | Kleijne | 365/228 |
| 4,766,516 | 8/1988 | Ozdemir et al. | 361/380 |
| 4,780,751 | 10/1988 | Nishimoto | 257/379 |
| 4,797,725 | 1/1989 | Hashimoto | 257/379 |
| 4,828,629 | 5/1989 | Ikeda et al. | 257/379 |
| 4,868,489 | 9/1989 | Kowalski | 324/61 |
| 4,920,402 | 4/1990 | Nakaya et al. | 357/68 |
| 4,933,898 | 6/1990 | Gilberg et al. | 365/53 |
| 4,987,464 | 1/1991 | Fukuda et al. | 257/358 |
| 5,336,624 | 8/1994 | Walden | 437/29 |
| 5,353,350 | 10/1994 | Unsworth et al. | 380/3 |
| 5,389,738 | 2/1995 | Piosenka et al. | 174/52.4 |
| 5,457,335 | 10/1995 | Kuroda et al. | 257/318 |

FOREIGN PATENT DOCUMENTS

| | | | |
|---|---|---|---|
| 0479461 | 4/1992 | European Pat. Off. | G11C 7/00 |
| 0300864 | 1/1989 | France | G01R 31/28 |
| 4018688 | 1/1991 | Germany | G06F 12/14 |
| 135665 | 8/1983 | Japan | 257/379 |

*Primary Examiner*—Tom Thomas
*Assistant Examiner*—Alexander Oscar Williams
*Attorney, Agent, or Firm*—Wayne P. Bailey

[57] ABSTRACT

The present invention provides an integrated circuit chip having one or more circuit elements that perform a desired circuit function with the circuit elements being encompassed by a molding compound that forms a package for the chip. The molding compound has a capacitance associated with it. The integrated circuit chip includes a second integrated circuit element within the molding compound in which the second integrated circuit element monitors the molding compound to detect a change in capacitance in the molding compound resulting from a removal of a portion or all of the molding compound. In response to a detection of a change in capacitance, the second integrated circuit element alters the desired circuit function provided by the other integrated circuit elements.

16 Claims, 6 Drawing Sheets

METHOD AND APPARATUS FOR PROTECTING FUNCTIONS IMBEDDED WITHIN AN INTEGRATED CIRCUIT FROM REVERSE ENGINEERING

BACKGROUND OF THE INVENTION

1. Technical Field

The present invention relates generally to integrated circuits and in particular to a method and apparatus for protecting functions imbedded with an integrated circuit from reverse engineering.

2. Description of the Related Art

In designing and manufacturing integrated circuits, a large amount of time, effort, and money are expended in producing integrated circuits. It is desirable to protect integrated circuits from reverse engineering in view of the expenditures in designing and manufacturing integrated circuits. Reverse engineering an integrated circuit includes removing the package surrounding the integrated circuit and probing the integrated circuit to identify functions provided by the integrated circuit. One known method for protecting integrated circuits from reverse engineering includes incorporating misleading warning labels on the integrated circuit itself. This method, however, wastes valuable real estate area. Additionally, such a labeling method does not deter a detailed examination of the integrated circuit. Another known method of preventing reverse engineering includes using packaging materials that destroy the chip during a decapping operation in which the surrounding package is removed to examine the integrated circuit. Such a packaging technique is expensive. Yet another known method for preventing reverse engineering includes placing a metalization blanket layer over the core of the integrated circuit to prevent voltage contrast scanning electron microscopy (SEM) from determining the patterns generated within the integrated circuit. The use of a metalization blanket layer, however, wastes a layer of metal interconnect and requires additional processing. Therefore, it would be advantageous to have a method and apparatus for preventing reverse engineering that does not waste valuable real estate area on an integrated circuit, does not require expensive packaging techniques, and does not require additional processing.

SUMMARY OF THE INVENTION

The present invention provides an integrated circuit chip having one or more circuit elements that perform a desired circuit function with the circuit elements being encompassed by a molding compound that forms a package for the chip. The molding compound has a capacitance associated with it. The integrated circuit chip includes a second integrated circuit element within the molding compound in which the second integrated circuit element monitors the molding compound to detect a change in capacitance in the molding compound resulting from a removal of a portion or all of the molding compound. In response to a detection of a change in capacitance, the second integrated circuit element alters the desired circuit function provided by the other integrated circuit elements.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

The process steps and structures described below do not form a complete process flow for manufacturing integrated circuits. The present invention can be practiced in conjunction with integrated circuit fabrication techniques currently used in the art, and only so much of the commonly practiced process steps are included as are necessary for an understanding of the present invention. The figures representing cross-sections and layouts of portions of an integrated circuit during fabrication are not drawn to scale, but instead are drawn so as to illustrate the important features of the invention.

Figure 1:
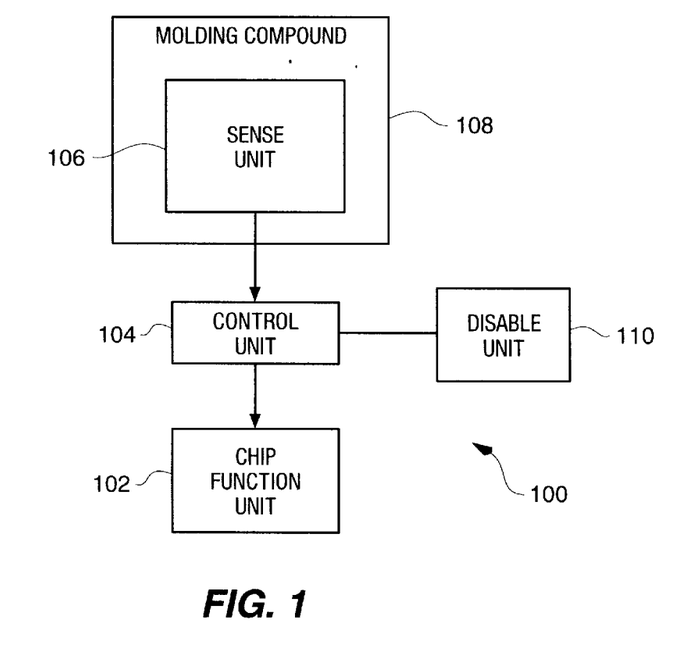
FIG. 1 is a block diagram of a method and apparatus for providing integrated circuit functionality security according to the present invention.

With reference now to FIG. 1, a block diagram of an apparatus for providing integrated circuit functionality security is depicted according to the present invention. Integrated circuit 100 includes a chip function unit 102, which provides a desired function through one or more integrated circuits. Chip function unit 102 is enabled or disabled by control unit 104. Whether chip function unit 102 is enabled or disabled is determined by an input into control unit 104 from sense unit 106. Sense unit 106 is employed to detect changes in capacitance caused by the proximity of molding compound 108 to sense unit 106. Molding compound 108 is the material that encapsulates the integrated circuit to form a packaged chip. The molding compound is used to provide a protective housing to protect one or more integrated circuits from light, humidity, and/or mechanical damage. In addition, the molding compound also provides a barrier to inspection or reverse engineering according to the present invention. The material may be any known material used to encapsulate integrated circuits to form a packaged chip. Molding compound 108 should be capable of generating a parasitic capacitance in the integrated circuit.

According to the present invention, the parasitic capacitance existing between the top-most layer of metalization and the molding compound used in packaging is employed as a factor to switch in or out functions within an integrated circuit. For example, when the molding compound and its associated capacitance are present, a specific detection circuit (e.g. sense unit 106 and control unit 104) permits the correct operation of the integrated circuit. When the molding compound has been removed, the detection circuit disables some or all functions and possibly enables other "false" functions to mislead attempts in reverse engineering the integrated circuit.

Disable unit 110 provides a mechanism to test the circuit without the package molding compound surrounding the integrated circuit during manufacturing. According to the present invention, either a pad which disables the detection circuit and is not bonded out at assembly or some other method of disabling the circuit is employed to allow testing. According to the present invention, the non-bonded pad is placed within the scribe lines surrounding the integrated circuit and is cut-off during dicing operations. Another method for providing an external disable unit 110 is to use a disabling pad to provide a code fed into a shift register that would hold the code to disable the parasitic capacitance detection circuit.

Figure 2:
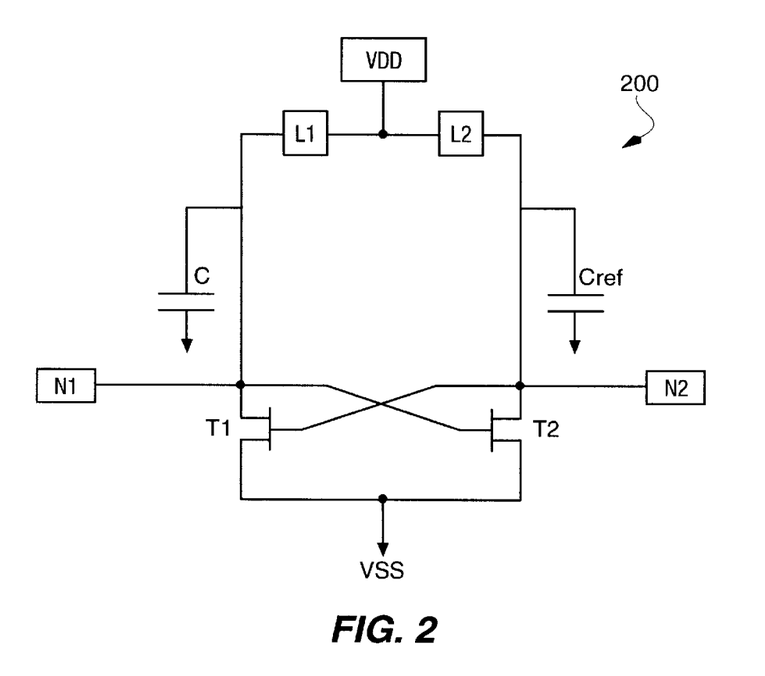
FIG. 2 is a schematic diagram of a detection circuit according to the present invention.

With reference now to FIG. 2, a schematic diagram of a detection circuit is depicted according to the present invention. Detection circuit 200 forms control unit 104 and sense unit 106 in FIG. 1 and includes transistors T1 and T2, which are crossed-coupled to each other to form a flip-flop. Transistors T1 and T2 are n-channel transistors in the depicted example. The sources of transistors T1 and T2 are connected to a lower power supply VSS. The drain of transistor T1 is connected to load device L1 and a capacitor C. Transistor T2 has its drain connected to a load device L2 and to a capacitor Cref. Capacitor Cref represents a capacitor of a known fixed value that is independent of the package molding material. Load devices L1 and L2 are connected to upper power supply voltage VDD.

As upper power supply voltage VDD is applied to detection circuit 200, if capacitor C has a capacitance greater than capacitor Cref, node N1 is forced to a low logic value and node N2 is forced to a high logic value. Conversely, if the molding compound has been removed the value of capacitor Cref is higher than the value of capacitor C, causing node N1 to take a high logic state upon the application VDD and node N2 goes to a logic low state. A high logic value at node N1 causes the chip function to be altered according to the present invention. In particular, node N2 is connected to integrated circuits providing the desired function. A low logic state at node N1 and a high logic state at node N2 causes the integrated circuits to perform normally while a high logic state at node N1 and a low logic state at node N2 causes the function to be altered by, for example, disabling the function, adding additional functions, or changing the function of the integrated circuit. According to the present invention, a low logic state can be forced at the disable input connected to node N1 to force node N1 to a low logic state at the application of VDD to test the integrated circuit.

Figure 3:
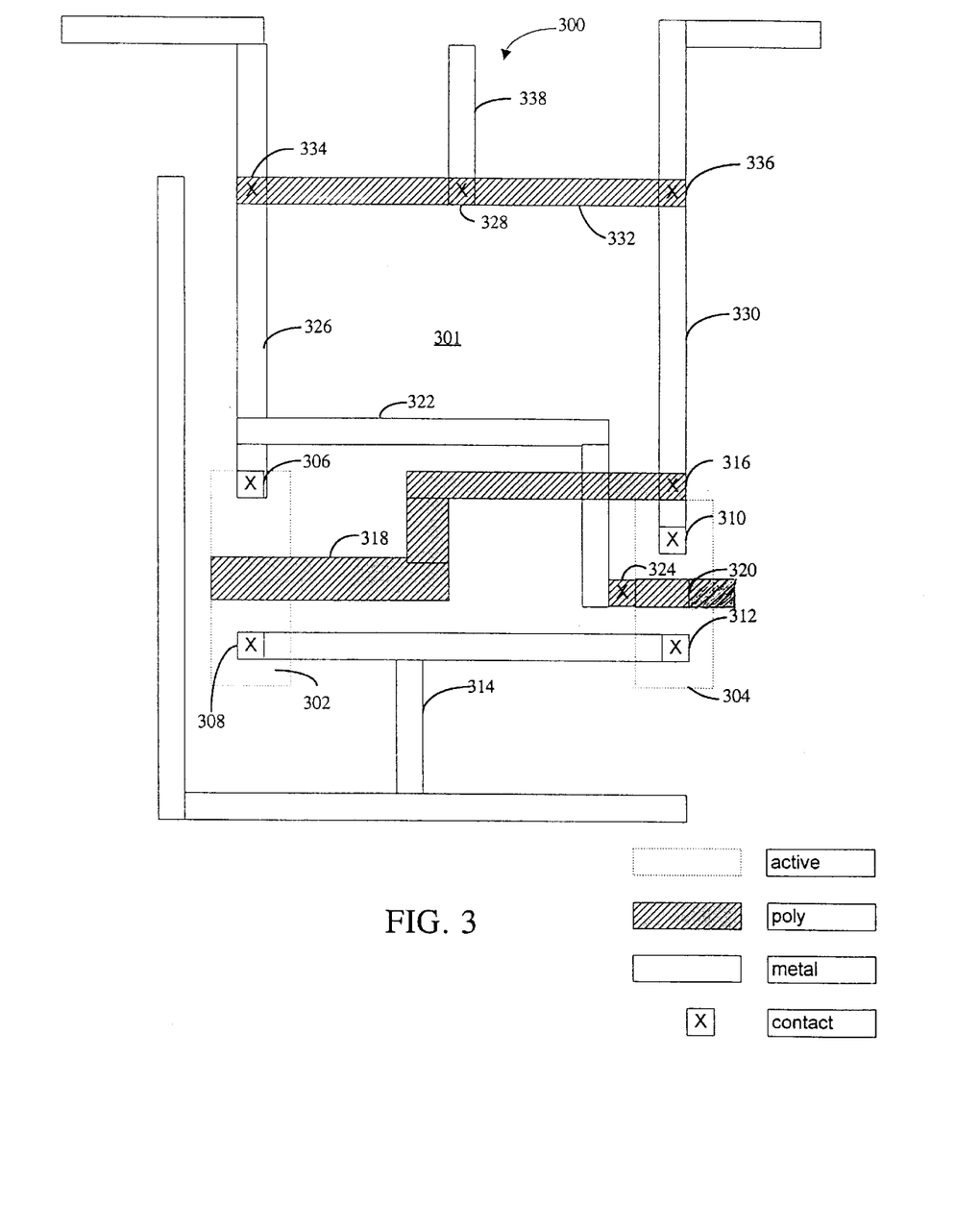
FIG. 3 is a layout of a detection circuit according to the present invention.

With reference now to FIG. 3, a layout of a detection circuit 200 in FIG. 2 is depicted according to the present invention. Detection circuit 300 is laid out in substrate 301 with active area 302 forming transistor T1 and active area 304 forming transistor T2 from FIG. 2. In the depicted example, substrate 301 is a silicon substrate. The present invention however, may be implemented in other substrates, such as, for example, gallium arsenide. Contact 306 forms an ohmic contact to the drain of transistor T1, while contact 308 forms an ohmic contact to the source of transistor T1. Similarly, contact 310 forms an ohmic contact to a drain while contact 312 forms an ohmic contact to a source for transistor T2. Metal line 314 connects the sources of transistors T1 and T2 to lower power supply voltage (e.g., VSS). In FIG. 2, transistors T1 and T2 are insulated gate field effect transistors. Other types of transistors also may be implemented according to the present invention, such as bipolar transistors.

Contact 316 provides a connection from the drain of transistor T2 to the gate of transistor T1 by connecting the drain of transistor T2 to the gate of transistor T1 via polysilicon line 318. Transistor T2 has a polysilicon area 320 that is connected to metal line 322 by contact 324. Metal line 322 is connected to metal line 326. Metal line 326 is connected to the drain of transistor T1 at contact 306, while metal line 330 is connected to the drain of transistor T2 at contact 310. Metal lines 326 and 330 are connected to polysilicon line 332 by contacts 334 and 336. Additionally, polysilicon line 332 is connected to an upper power supply voltage (e.g. VDD) through metal line 338 by contact 328. Polysilicon line 332 forms loads L1 and L2 from FIG. 2. In particular, loads L1 and L2 are polysilicon resistors according to the present invention. Metal line 330 forms capacitor Cref in FIG. 2 with the capacitance being generated between metal line 330 and substrate 301 in which the integrated circuit is found. Capacitance of capacitor C is formed by the capacitance between metal line 314 and metal line 326 and the molding compound according to the present invention. Metal line 330 also provides a path to alter or disable functions within the integrated circuit if the molding compound is removed from the integrated circuit. When the molding compound is present, metal line 330 provides a signal that allows for normal or desired functions with the integrated circuit If the flip-flop is periodically reset by setting its local VDD to 0 volts and setting N1 and N2 to VSS, when VDD is re-applied, the circuit will re-detect the existence of the molding compound. The circuit detects the increased capacitance due to the molding compound only when the local VDD is applied to the circuit and nodes N1 and N2 are at the same zero voltage or VSS. When local VDD is applied, node N1 changes more slowly due to the increased RC time constant associated with the capacitance in capacitor C. If this operation is performed periodically while the chip is under power, this will prevent the correct functioning of the IC from being determined by an intruder who holds the IC in an active powered state during the decapping operation.

If the packaging is removed and voltage VDD is applied, transistor T2 is turned on and the voltage at node N2 is low. Metal line 326 also is used to provide a disable input into node N1 for testing the integrated circuit before it is packaged to form a packaged chip. This metal line runs to an edge of a scribe line which will be cut when the wafer is diced to produce the individuals that will be placed within a package to form an integrated circuit.

Figure 4:
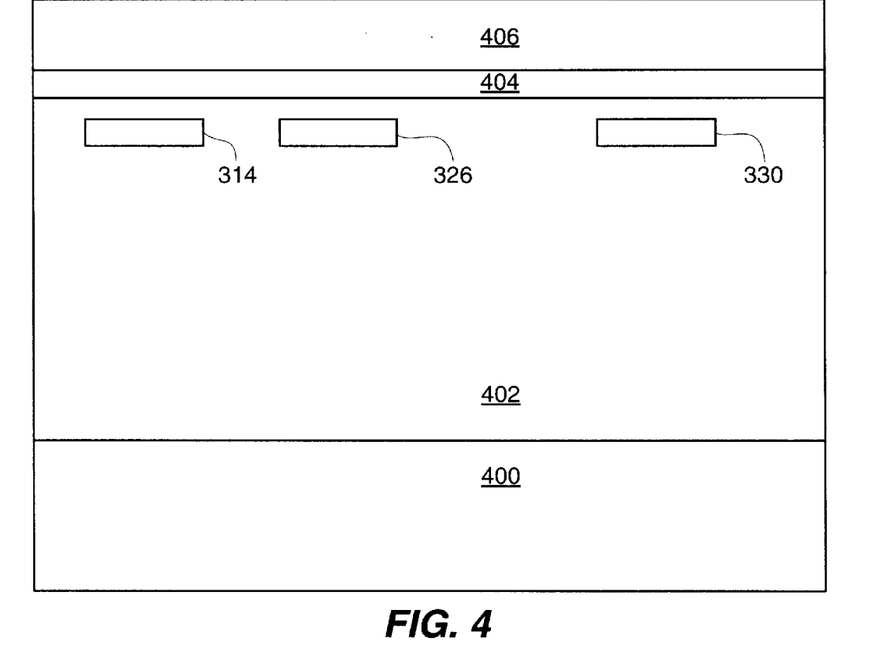
FIG. 4 is a cross-sectional view of the detection circuit in FIG. 3 according to the present invention.

With reference now to FIG. 4, a cross-sectional view of the detection circuit 300 in FIG. 3 is illustrated according to the present invention. Substrate 400 has oxide layers 402 overlying it. Within oxide layers 402 are metal lines 314, 326 and 330. Metal line 314 is the metal line leading to the lower power supply voltage VSS, while metal line 326 is the metal line leading to transistor T1 in FIG. 3. Metal line 330 is the metal line leading to node N2 and transistor T2 in FIG. 3. Passivation layer 404 is formed over oxide layers 402 and metal lines 314, 326 and 330. Molding compound layer 406 is formed over the passivation layer according to the present invention. As can be seen, capacitor C is formed between the two metal lines with fringing capacitance formed by the passivation and molding compound and capacitor Cref is the capacitor formed between the metal line and the substrate. Alternatively, capacitor Cref could be formed by any other structure that produces a capacitor independent of the existence of molding compound layer 406. For example, a capacitor could be formed between the polysilicon layer and the active area.

Figure 5:
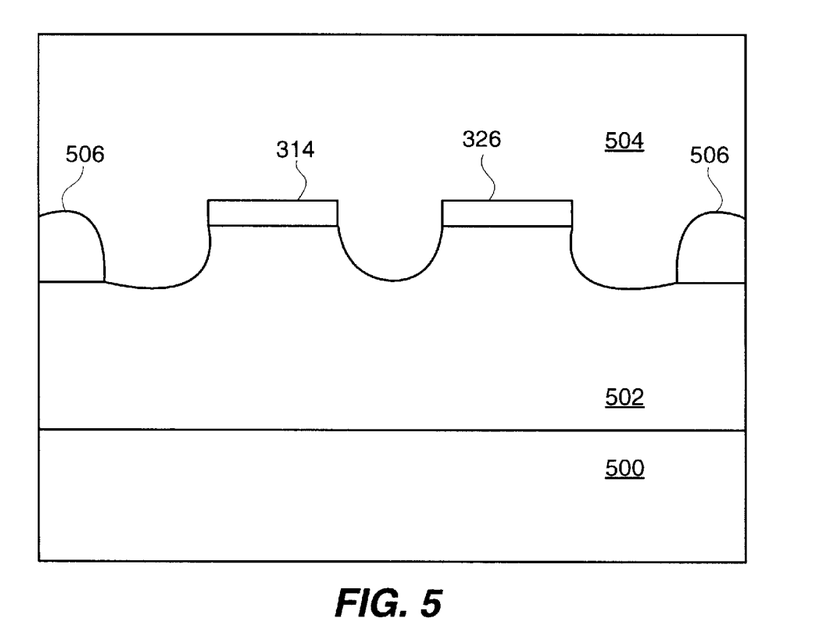
FIG. 5 is a cross-sectional view without a passivation layer between the metal lines and the molding compound layer according to the present invention.

With reference now to FIG. 5, a cross-sectional view without a passivation layer between the metal lines and the molding compound layer is depicted according to the present invention. Substrate 500 has oxide layers 502 formed over it. Metal lines 314 and 326 are formed on oxide layers 502 with a molding compound layer 504 being formed directly over the metal lines. As can be seen in this depicted example, passivation layer 506 is formed in areas other than over the metal lines providing a direct connection between molding compound layer 504 and metal lines 314 and 326. Such a layout provides a more sensitive architecture to detect a removal of the molding compound according to the present invention.

Figure 6:
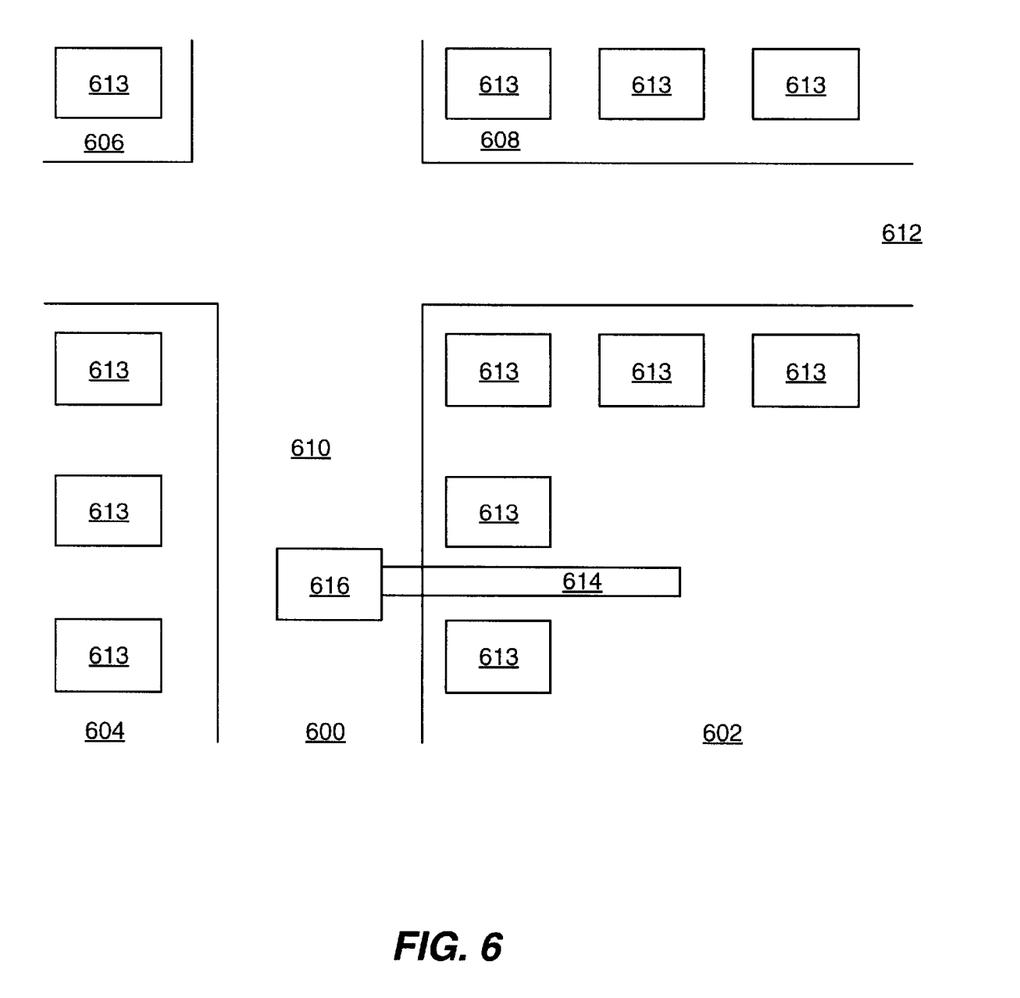
FIG. 6 is a diagram of a disable pad according to the present invention.

With reference now to FIG. 6, a diagram of a disable pad is depicted according to the present invention. Wafer 600 is a silicon wafer in the depicted example containing circuit areas 602, 604, 606, and 608. Each of the circuit areas includes pads 613, which are used to send and receive signals to and from circuit areas 602, 604, 606, and 608. These pads are connected to pins when the circuit areas are diced and encapsulated with a molding compound to form packaged integrated circuit chips.

Each of the circuit areas are defined by scribe lines 610 and 612. Each circuit area will be separated from the other circuit areas through a dicing process, with the separated circuit areas forming die, and packaged to form packaged integrated circuit chips. Circuit area 602 includes a metal line 614 that is connected to disable pad 616. Additionally, metal line 614 has a connection to a detection circuit, such as detection circuit 300 in FIG. 3. Circuit areas 604, 606, and 608 may be identical to circuit area 602 with disable pad 616 and metal line 614 not shown. Prior to the dicing of the circuit areas, no molding compound is present, which means no parasitic capacitance associated with the molding compound is present.

Disable pad 616 is employed to force the detection circuit into the state it would be in if the molding compound were present. In particular, node N1 in detection circuit 300 would be forced to a low value to test the circuitry located within circuit area 602 according to the present invention. During dicing, a saw blade traverses scribe lines 610 and 612, resulting in disable pad 616 being separated from circuit area 602. As a result, disable pad 616 is no longer available after the wafer has been diced and integrated circuit chips formed from the separated circuit areas.

Figure 7:
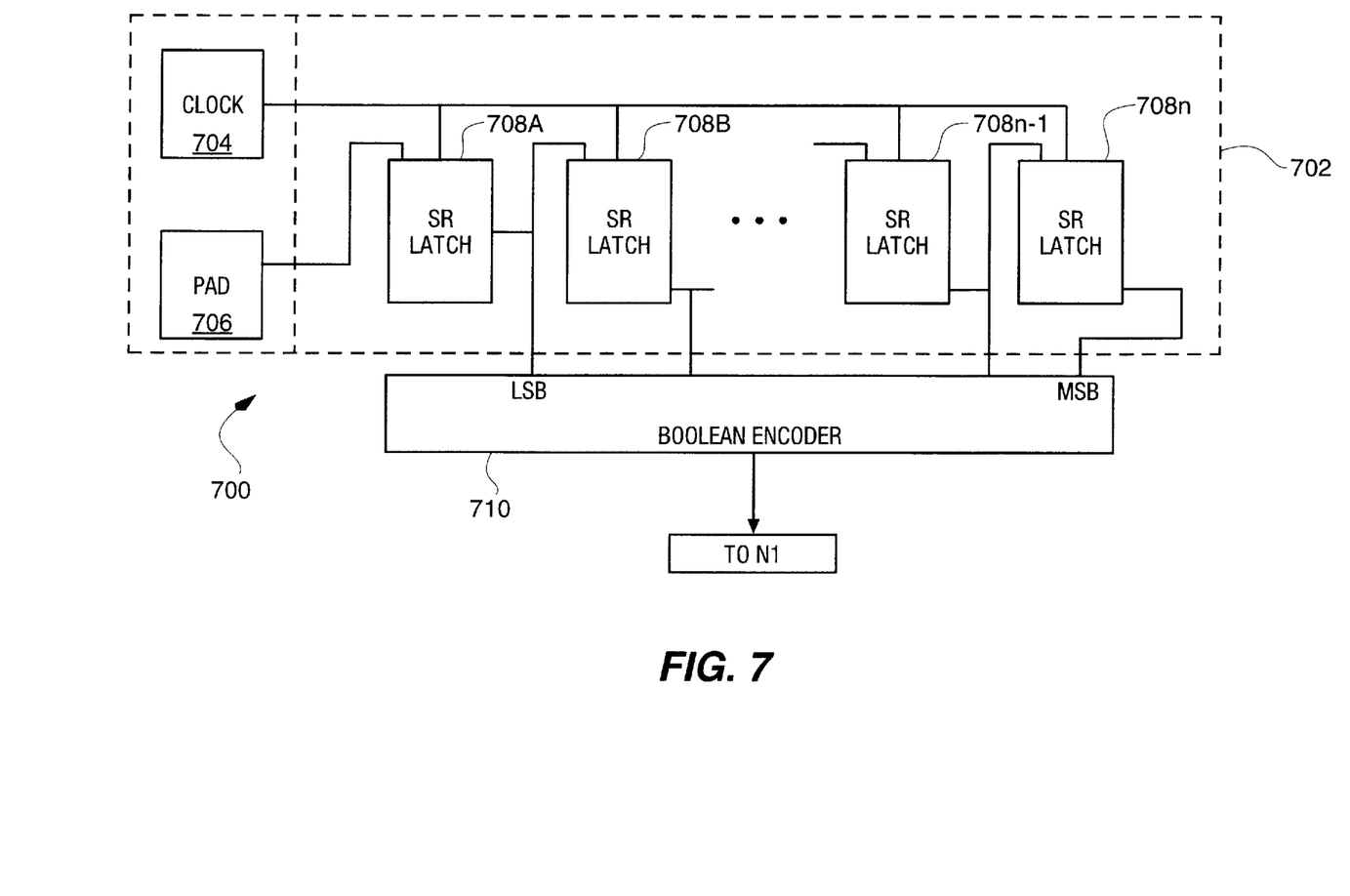
FIG. 7 is a block diagram of a disable circuit according to the present invention
Figure 8:
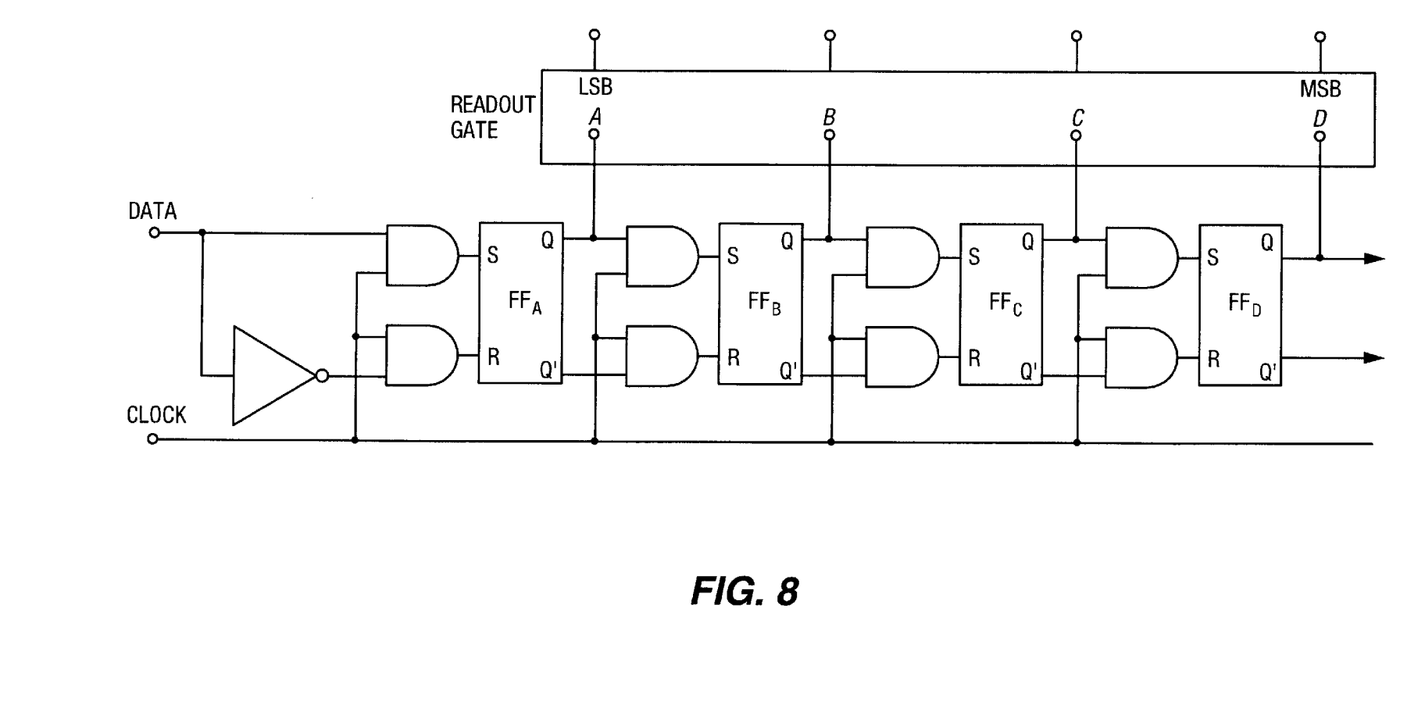
FIG. 8 is a shift register circuit according to the present invention.

Turning next to FIG. 7, a block diagram of a disable circuit using a shift register circuit is depicted according to the present invention. Disable circuit 700 includes a shift register circuit 702, which includes a clock pad 704 and a data pad 706 into SR latches 708a–708n. Data from data pad 706 is divided into data and data* according to the present invention. The signals data and clock become the S input into the SR latches, while the signals data* and clock become the R input into the latch. The output Q of the SR latch and the clock signal become the S input into the next stage and the output Q* and clock become the R input into the next stage. Shift register circuit 702 is a standard shift register circuit known to those of ordinary skill in the art, and shown in detail in FIG. 8. More information on shift registers may be found in Ryder, *Electronic fundamentals and Applications*, Prentice Hall 1976.

Disable circuit 700 also includes a boolean encoder 710, which has a connection to the output of each SR latch, with the connection to SR latch 708a being the least significant bit and the connection to SR latch 708n being the most significant bit. Boolean encoder 710 also includes an output connected to node N1 in detection circuit 300 in FIG. 3. Boolean encoder 710 includes a combination of gates that provide a logical low to node N1 in response to a specific combination of bits LSB to MSB known to those skilled in the art. The exact types of gates and layout of gates used to construct boolean encoder 710 depends on the combination of bits desired for creating a logical low to node N1. Alternatively, the input into boolean encoder circuit 710 may be provided from a specific set of inputs from multiple pads according to the present invention.

Thus, the present invention provides an improved mechanism for protecting functions imbedded within an integrated circuit from a reverse engineering that involves the removal of the surrounding package. The present invention provides protection from reverse engineering without requiring expensive packaging techniques or wasting a layer of metal interconnect and associated additional processing by using parasitic capacitance associated with a molding compound used to package the integrated circuit. According to the present invention, functions are altered when the capacitance changes due to the removal of the molding compound to mislead efforts on reverse engineering the integrated circuit.

While the invention has been particularly shown and described with reference to a preferred embodiment, it will be understood by those skilled in the art that various changes in form and detail may be made therein without departing from the spirit and scope of the invention.

What is claimed is:

1. An integrated circuit device comprising:
   a gallium arsenide substrate;
   a first circuit formed on the substrate wherein the first circuit performs a function;
   a second circuit formed on the substrate, the second circuit being electrically connected to the first circuit and controlling the function of the first circuit; and
   a molding compound encapsulating the substrate, the first circuit, and the second circuit, the molding compound having an associated capacitance, wherein the associated capacitance is used by the second circuit to control the function of the first circuit.

2. An integrated circuit device comprising:
   a substrate;
   a first circuit formed on the substrate wherein the first circuit performs a function;
   a second circuit formed on the substrate, the second circuit being electrically connected to the first circuit and controlling the function of the first circuit; and
   a molding compound encapsulating the substrate, the first circuit, and the second circuit, the molding compound having an associated capacitance, wherein the associated capacitance is used by the second circuit to control the function of the first circuit, and wherein the second circuit controls the function of the first circuit by altering the function of the first circuit in response to a change in the associated capacitance caused by removal of at least a portion of the molding compound, wherein the second circuit includes:
   a reference capacitor having a pre-selected capacitance independent of the associated capacitance of the molding compound; and
   a detection circuit connected to the reference capacitor, wherein the pre-selected capacitance is compared to the associated capacitance of the molding compound by the detection circuit to detect a removal of at least a portion of the molding compound and the detection circuit alters the function of the first circuit in response to the detection of a removal of the molding compounding.

3. An integrated circuit device comprising:

a substrate;

a first circuit formed on the substrate wherein the first circuit performs a function;

a second circuit formed on the substrate, the second circuit being electrically connected to the first circuit and controlling the function of the first circuit; and a molding compound encapsulating the substrate, the first circuit, and the second circuit, the molding compound having an associated capacitance, wherein the associated capacitance is used by the second circuit to control the function of the first circuit, wherein a passivation layer is located between the molding compound and the first circuit, the second circuit, and the substrate.

4. An integrated circuit device comprising:

a substrate;

a first circuit formed on the substrate wherein the first circuit performs a function;

a second circuit formed on the substrate, the second circuit being electrically connected to the first circuit and controlling the function of the first circuit; and a molding compound encapsulating the substrate, the first circuit, and the second circuit, the molding compound having an associated capacitance, wherein the associated capacitance is used by the second circuit to control the function of the first circuit, wherein the second circuit comprises:

a first transistor having a source, a drain, and a gate, wherein the source is connected to a lower power supply voltage and the drain is connected to the associated capacitance;

a second transistor having a source, a drain, and a gate, wherein the gate is connected to the drain of the first transistor, the source is connected to a lower power supply voltage, and the drain is connected to the gate of the first transistor and the first circuit, wherein a voltage at the drain controls the function of the first circuit;

a reference capacitor connected to the drain of the second transistor;

a first resistor having a first end connected to the drain of the first transistor and a second end connected to an upper power supply voltage; and a second resistor having a first end connected to the drain of the second transistor and a second end connected to the upper power supply voltage.

5. The integrated circuit device of claim 4, wherein the first transistor and the second transistor are insulated gate field effect devices.

6. The integrated circuit device of claim 4, further comprising a disable pad connected to the drain of the first transistor.

7. The integrated circuit of claim 4, further comprising a disable circuit including:

an input pad;

a shift register having an input connected to the input pad and a plurality of outputs; and a boolean encoder having a plurality of inputs connected to the plurality of outputs from the shift register and an output connected to the drain of the first transistor, wherein the output of the boolean encoder controls the first transistor and the second transistor.

8. An integrated circuit system comprising:

a first integrated circuit element, the first integrated circuit element performing a desired circuit function;

a molding compound encompassing the first integrated circuit element, wherein a capacitance is associated with the molding compound; and a second integrated circuit element encompassed within the molding compound, wherein the second integrated circuit element is connected to the first integrated circuit element and detects a chance in capacitance resulting from a removal of at least a portion of the molding compound, and alters the desired circuit function of the first integrated circuit element in response to a detection of the removal of at least a portion of the molding compound, wherein a passivation layer lies between the molding compound and the first integrated circuit and the second integrated circuit.

9. An integrated circuit system comprising:

a first integrated circuit element, the first integrated circuit element performing a desired circuit function;

a molding compound encompassing the first integrated circuit element, wherein a capacitance is associated with the molding compound;

a second integrated circuit element encompassed within the molding compound, wherein the second integrated circuit element is connected to the first integrated circuit element and detects a change in capacitance resulting from a removal of at least a portion of the molding compound, and alters the desired circuit function of the first integrated circuit element in response to a detection of the removal of at least a portion of the molding compound; and a third integrated circuit element and wherein the second integrated element alters the desired circuit function by enabling the third second element.

10. An integrated circuit system comprising:

a first integrated circuit element, the first integrated circuit element performing a desired circuit function;

a molding compound encompassing the first integrated circuit element, wherein a capacitance is associated with the molding compound; and a second integrated circuit element encompassed within the molding compound, wherein the second integrated circuit element is connected to the first integrated circuit element and detects a change in capacitance resulting from a removal of at least a portion of the molding compound, and alters the desired circuit function of the first integrated circuit element in response to a detection of the removal of at least a portion of the molding compound; and a third integrated circuit element and wherein the second integrated circuit element alters the desired circuit function by enabling the third integrated element and disabling the first integrated circuit element.

11. An integrated circuit system comprising:

a first integrated circuit element, the first integrated circuit element performing a desired circuit function;

a molding compound encompassing the first integrated circuit element, wherein a capacitance is associated with the molding compound; and a second integrated circuit element encompassed within the molding compound, wherein the second integrated circuit element is connected to the first integrated circuit element and detects a chance in capacitance resulting from a removal of at least a portion of the molding compound, and alters the desired circuit function of the first integrated circuit element in response to a detection of the removal of at least a portion of the molding compound, wherein the second integrated circuit element includes a capacitor, the capacitor being compared to the capacitance associated with the molding compound to detect a change in capacitance resulting from a removal of at least a portion of the molding compound.

12. An integrated circuit device comprising:

an integrated circuit for performing a desired function;

a detection circuit for detecting a change in capacitance caused by a removal of at least a portion of a molding compound and for altering the function of the integrated circuit in response to a detection of a change in capacitance caused by removal of at least a portion of the molding compound and disable means for disabling the detection circuit.

13. The circuit device of claim 12, wherein the altering means comprises means for disabling the integrated circuit.

14. The circuit device of claim 12, wherein the altering means comprises means for adding an undesired function to the integrated circuit.

15. The circuit device of claim 12, further comprising a second integrated circuit for performing an undesired function, wherein the altering means comprises means for enabling the second integrated circuit without disabling the integrated circuit.

16. An integrated circuit device comprising:

an integrated circuit for performing a desired function;

a molding compound encompassing the integrated circuit;

a capacitance associated with the molding compound;

monitoring means for monitoring the capacitance associated with the molding compound;

detection means for detecting a change in capacitance caused by a removal of at least a portion of the molding compound; and altering means for altering the function of the integrated circuit in response to a detection of a change in capacitance caused by removal of at least a portion of the molding compound, wherein a passivation layer lies between the molding compound and the integrated circuit.

* * * * *